PANGBORN & BEERS.
Wheel-Cultivator.
No. 53,663. Patented Apr. 3, 1866.
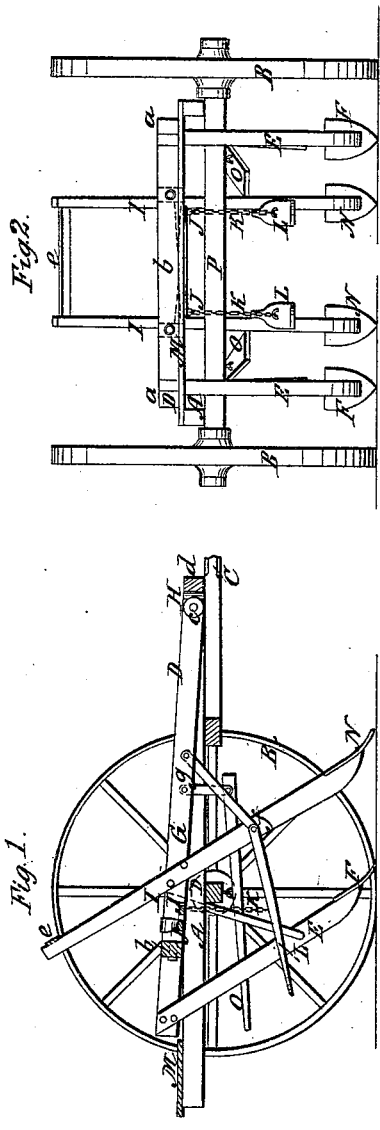
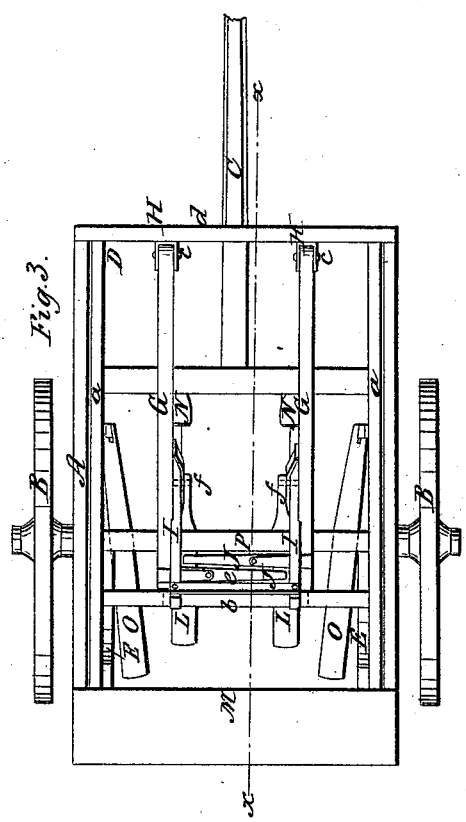

UNITED STATES PATENT OFFICE.

C. S. PANGBORN AND GEORGE W. BEERS, OF ONARGA, ILLINOIS.

IMPROVEMENT IN CULTIVATORS.

Specification forming part of Letters Patent No. 53,663, dated April 3, 1866.

*To all whom it may concern:*

Be it known that we, CYRUS S. PANGBORN and GEORGE W. BEERS, of Onarga, in the county of Iroquois and State of Illinois, have invented a new and Improved Cultivator; and we do hereby declare that the following is a full, clear, and exact description thereof, which will enable those skilled in the art to make and use the same, reference being had to the accompanying drawings, forming part of this specification, in which—

Figure 1 is a side sectional view of our invention, taken in the line $x\ x$, Fig. 2; Fig. 2, a rear view of the same in elevation; Fig. 3, a plan or top view of the same.

Similar letters of reference indicate corresponding parts.

This invention consists in a novel manner of operating the plows, whereby the latter, as the machine is drawn along, may be moved or adjusted with the greatest facility, both as regards the lateral movement of the plows which work near the rows of plants and the vertical movement of all of the plows, so that they may be raised and lowered out from and into the ground.

A represents a rectangular frame, which is mounted on two wheels, B B, and has a draft-pole, C, attached to it; and D is a rectangular frame, which is fitted within the frame A and has its side pieces, *a a*, connected to the front part of the frame A by screws or pivots *b*, to admit of the frame D being raised and lowered.

The side pieces, *a a*, of the frame D serve as plow-beams, and have each an inclined standard, E, attached to their rear parts, the lower ends of said standards having plows F secured to them; and G G are two plow-beams, the rear ends of which are pivoted in the cross-bar *b*, which connects the rear parts of the side pieces, *a a*, the front ends of said beams being secured by pivots *c* in sockets H, which are fitted in the front cross-bar, *d*, of the frame A, so that they may turn freely therein.

The plow-beams G G have standards I I attached to them, one to each, and said standards extend up above the beams G, and are connected at their upper ends by a bar, *e*, and each beam G has an arm, J, projecting from its inner side at right angles, near its rear end. The ends of these arms J J are connected by chains K K with treadles L L, the front ends of which are secured by pivot-bolts *f* to the standards I I, and the driver, by operating these treadles from his seat M, may turn the plow-beams G G, and consequently move the plows N of the standards I I, either to the right or left, as may be desired.

O O are treadles, which are connected with the axle P of the machine, and have their front ends connected with the side pieces, *a a*, of the frame D by means of links *g g*. By operating these treadles O O the frame D may be raised and all of the plows elevated above the surface of the ground when required, as, for instance, in turning at the ends of rows, drawing the machine from place to place, &c.

It will be seen from the above description that the device will be under the complete control of the operator and the plows rendered capable of being adjusted with the greatest facility to conform to the sinuosities of the rows of plants, and also raised above the surface of the ground when necessary.

Having thus described our invention, we claim as new and desire to secure by Letters Patent—

The combination of the treadles L L, plow-beams G G, swivel-sockets H H, arms J J, treadles O O, and frame D, constructed and arranged to operate in the manner as and for the purpose herein specified.

C. S. PANGBORN.
GEO. W. BEERS.

Witnesses:
IRA NICHOLS,
JOHN A. HALL.